United States Patent [19]
Funahashi et al.

[11] Patent Number: 5,845,167
[45] Date of Patent: Dec. 1, 1998

[54] CAMERA WITH A BARRIER

[75] Inventors: Akira Funahashi, Sakai; Junichi Tanii, Izumi, both of Japan

[73] Assignee: Minolta Co., Ltd., Osaka, Japan

[21] Appl. No.: 917,568

[22] Filed: Aug. 26, 1997

Related U.S. Application Data

[63] Continuation of Ser. No. 780,240, Jan. 8, 1997, abandoned.

[30] Foreign Application Priority Data

Jan. 12, 1996 [JP] Japan ................................. 8-004324

[51] Int. Cl.⁶ .............................. G03B 11/04; G03B 17/02
[52] U.S. Cl. .......................... 396/448; 396/176; 396/535
[58] Field of Search .................................. 396/348, 349, 396/448, 535, 176

[56] References Cited

U.S. PATENT DOCUMENTS

| | | | |
|---|---|---|---|
| 4,283,132 | 8/1981 | Engelsman et al. | 396/448 |
| 4,451,130 | 5/1984 | Yan | 396/424 |
| 5,461,441 | 10/1995 | Kotani | 396/448 |
| 5,617,167 | 4/1997 | Kaji | 396/448 |

FOREIGN PATENT DOCUMENTS

| | | |
|---|---|---|
| 63-162331 | 10/1988 | Japan . |
| 2-21629 | 2/1990 | Japan . |
| 2-83533 | 6/1990 | Japan . |
| 2-119226 | 9/1990 | Japan . |
| 4-137337 | 12/1992 | Japan . |
| 5-81831 | 11/1993 | Japan . |
| 6-273825 | 9/1994 | Japan . |
| 6-273836 | 9/1994 | Japan . |
| 7-159857 | 6/1995 | Japan . |
| 8-29835 | 2/1996 | Japan . |

*Primary Examiner*—Alan A. Mathews
*Attorney, Agent, or Firm*—McDermott, Will & Emery

[57] ABSTRACT

A camera having a barrier which is rotatable around a shaft substantially parallel to an optical axis of a lens and between a closing position in which a lens barrel, an electronic flash and optical elements are covered by the barrier and an opening position in which the barrier uncovers those elements.

24 Claims, 4 Drawing Sheets

CAMERA WITH A BARRIER

This is a continuation of application Ser. No. 08/780,240 filed Jan. 8, 1997, now abandoned.

BACKGROUND OF THE INVENTION

1. Field of the Invention

The present invention relates to a camera with a barrier, and more specifically relates to a camera having a barrier in the front side of its body.

2. Description of the Related Art

Conventionally, such a compact camera is well known as includes an openable barrier which opens and closes a lens barrel, a finder objective portion and an electronic flash portion on the front side of the camera body, in an aspect of security or design. A barrier of this type is generally movable in a horizontal direction (slide type) within the front portion of the camera body.

However, concerning the slide type barrier, openable area is limited to the lens barrel and the upper and lower portions thereof. Thus, the finder objective portion, the electronic flash portion and the like should be arranged in the narrow openable area, which causes unreasonability in design.

Further, if the electronic flash portion is arranged near the lens barrel, red-eye phenomenon is caused. If the electronic flash portion is arranged away from the lens barrel to prevent this phenomenon, it becomes impossible to close the electronic flash portion with the barrier and a separate pop-up mechanism is required to cover the electronic flash portion when not in use, which increases the cost.

OBJECTS AND SUMMARY

A main object of the present invention is to provide a camera with a barrier which widely covers a lens barrel, an electronic flash portion, optical elements such as AF or AE and the like.

Another object of the present invention is to provide such a camera as described above at a reduced cost.

These and other objects of the present invention are accomplished by providing a camera comprising a camera body, a lens barrel arranged in a front portion of the body, an electronic flash arranged in the front portion of the body and in the vicinity of said lens barrel, optical elements arranged in the front portion of the body and in the vicinity of said lens barrel, and a barrier rotatable around a shaft substantially parallel to an optical axis of a lens and between a closing position in which the lens barrel, the electronic flash and the optical elements are covered by the barrier and an opening position in which the barrier uncovers those elements.

These and other objects, advantages and features of the invention will become apparent from the following description thereof taken in conjunction with the accompanying drawings with illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
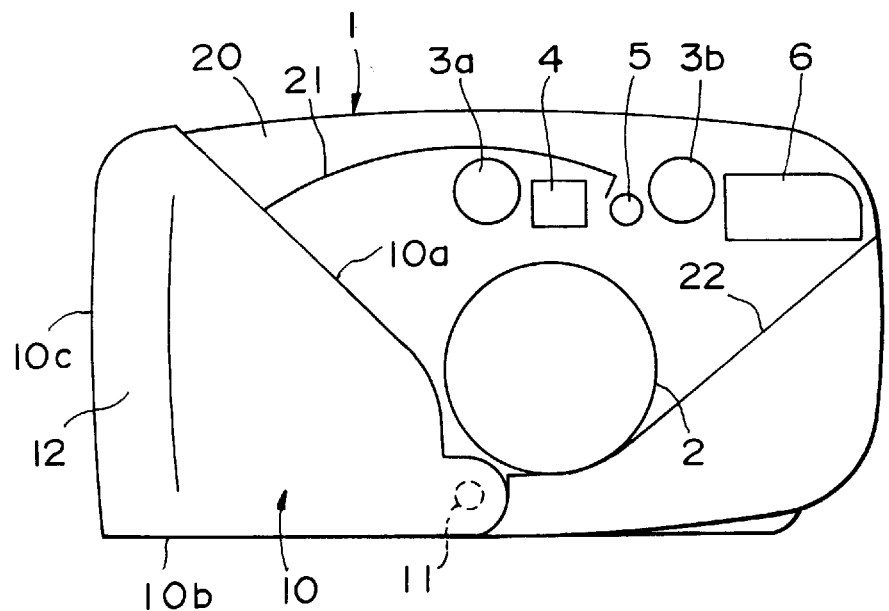
FIG. 1 is a front view of a camera with a barrier of a first embodiment of the present invention in a state that the barrier is opened.

Referring now to the drawings, the camera with a barrier of the present invention will be explained.

First embodiment, FIG. 1 to FIG. 4

In FIG. 1, numeral 1 is a camera body and numeral 10 is a barrier. In the front portion of the camera body 1, lens barrel 2 is provided substantially in the center. Provided above the lens barrel 2 are AF light emitting portion 3a, AF light receiving portion 3b, finder objective portion 4 and AE light receiving portion 5. Diagonally above the lens barrel 2, electronic flash portion 6 is provided.

Figure 4:
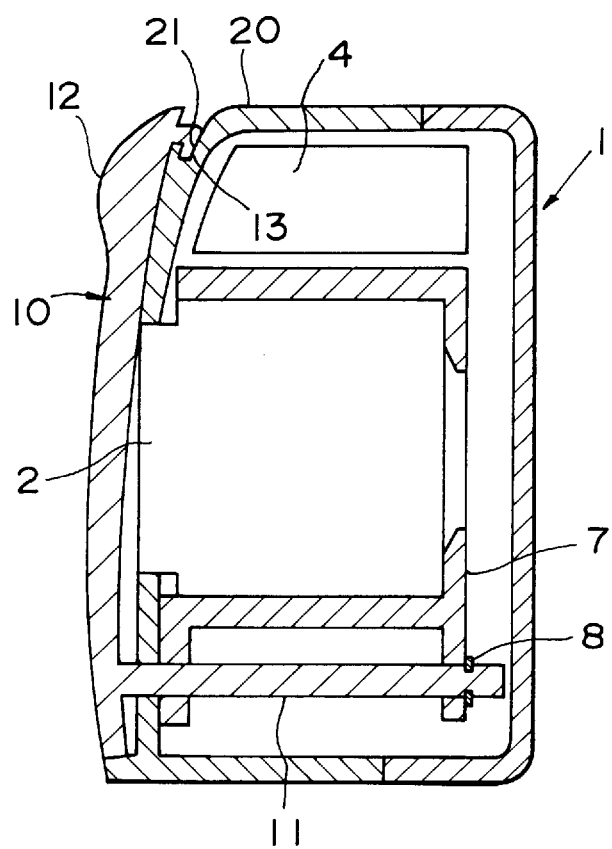
FIG. 4 is a cross sectional view showing the first embodiment.

The barrier 10 is rotatably arranged in the front portion of the camera body 1 with shaft 11 as a fulcrum, and substantially right triangle-shaped. As shown in FIG. 4, the shaft 11 is extended to the backside of the camera body 1, held by inside frame 7 and fixed by E-ring 8. The shaft 11 is positioned in an acute angle portion of the barrier 10 and arranged in the vicinity of the lower left portion of the lens barrel 2. Further, the barrier 10 includes holding portion 12 which rises from the surface of the barrier 10 and guide projection 13 provided on its rear surface.

Figure 2:
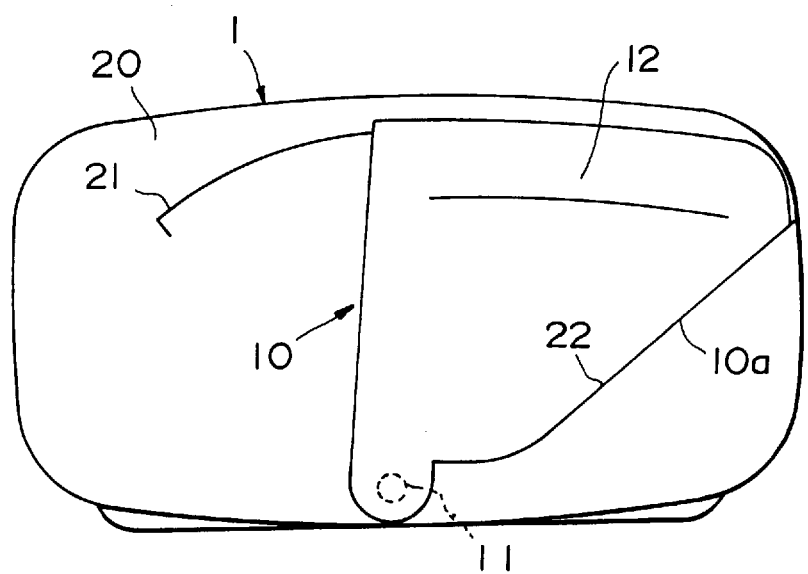
FIG. 2 is a front view showing a state that the barrier is closed in the camera of the first embodiment.
Figure 3:
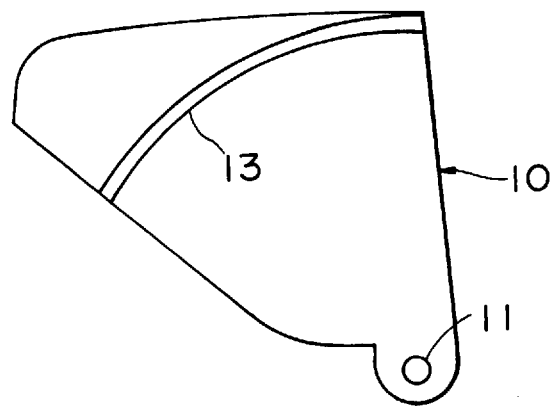
FIG. 3 is a backside view of the barrier of the first embodiment.

On front frame 20 of the camera body 1, concave guide rail 21 and step portion 22 are arranged as shown in FIGS. 1 and 2. The projection 13 of the barrier 10 is interlocked with the guide rail 21. The rail 21 and the projection 13 are concentric around the shaft 11.

According to the above-mentioned arrangement, barrier 10 is rotatable with the shaft 11 as a fulcrum by the projection 13 being guided along the rail 21. When side 10a is rotated until it contacts with the step portion 22 as shown in FIG. 2, the barrier 10 closes the AF light emitting portion 3a, the AF light receiving portion 3b, the finder objective portion 4, the AE light receiving portion 5 and the electronic flash portion 6. The barrier 10 is set to this state when the camera is not in operation.

When the camera is to be used, the barrier 10 is rotated to left to open the lens barrel 2, the AF light emitting portion 3a, the AF light receiving portion 3b, the finder objective portion 4, the AE light receiving portion 5 and the electronic flash portion 6 as shown in FIG. 1. Both in opening position and closing position, the barrier 10 is retained at each position by an unillustrated click mechanism. In the opening state the barrier 10 turns on an unillustrated switch for detecting opening state, thereby the power of the camera body is turned on.

According to the first embodiment, since the barrier 10 is rotatably provided in the front portion of the camera body 1, the opening and closing area is wide and the AF light emitting portion 3a, the AF light receiving portion 3b, the finder objective portion 4, the AE light receiving portion 5, the electronic flash portion 6 and the like are comfortably arranged. Especially, even if the electronic flash portion 6 is arranged away from the lens barrel 2, the barrier 10 is able to cover it, thereby red-eye phenomenon caused in strobe photography is reduced or prevented.

Further, the barrier 10 is substantially right triangle-shaped and is arranged in the opening state shown in FIG. 1 so that side 10b substantially accords with the base of the camera body 1 and at the same time side 10c substantially accords with the left edge of the camera body 1. On this condition, by arranging the shaft 11 diagonally left of and below the lens barrel 2, it becomes possible to minimize the size of the barrier 10 and at the same time to maximize the opened and closed area.

Further, each elements are arranged so that crossing angles between a segment connecting the center of the lens barrel 2 and the shaft 11 and a segment connecting the center of the lens barrel 2 and each of the AF light emitting portion 3a, the AF light receiving portion 3b, the finder objective portion 4, the AE light receiving portion 5 and the electronic flash portion 6 become over 90°, thereby the range of rotation of the barrier can be reduced. According to this embodiment, the barrier 10 is rotated approximately 90° around the shaft 11 to move to the closing position.

Figure 5:
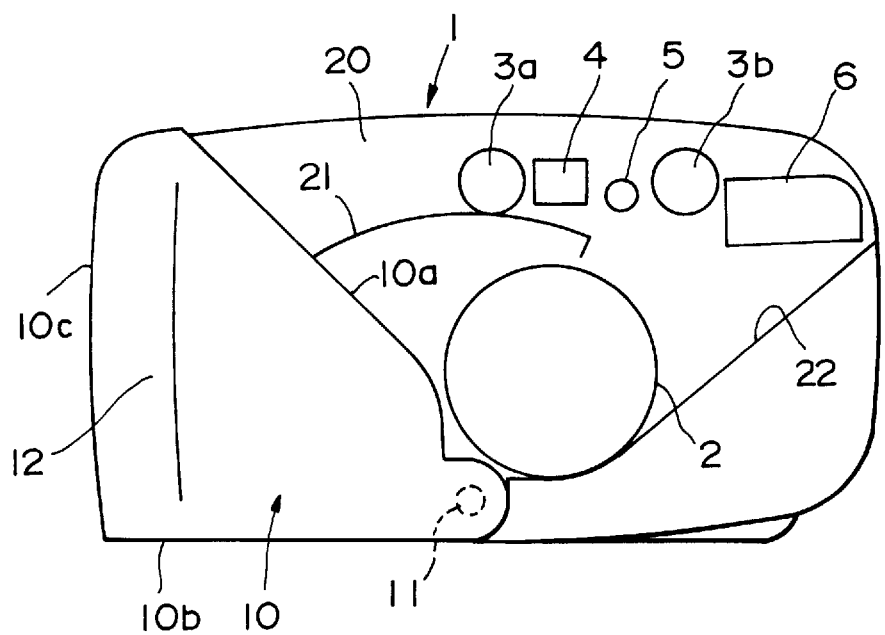
FIG. 5 is a front view showing a camera with a barrier of the second embodiment of the present invention in a state that the barrier is opened.
Figure 6:
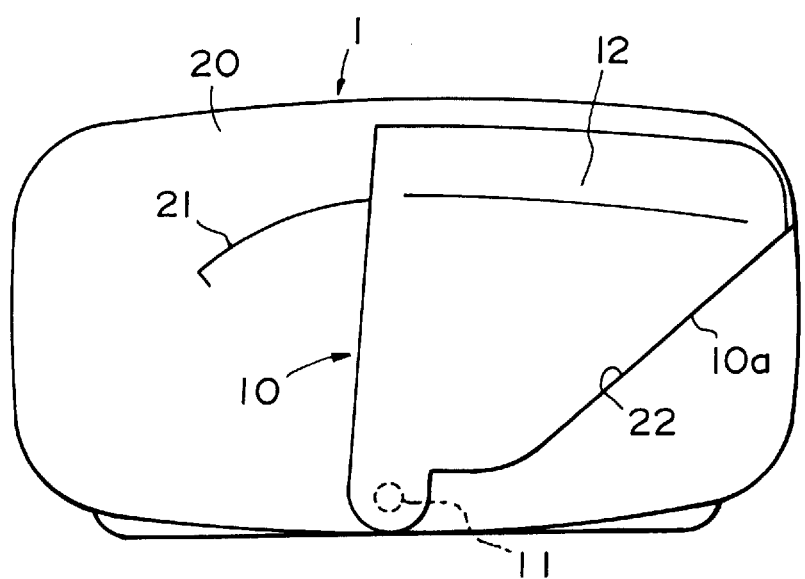
FIG. 6 is a front view showing a state that the barrier is closed in the camera of the second embodiment.
Figure 7:
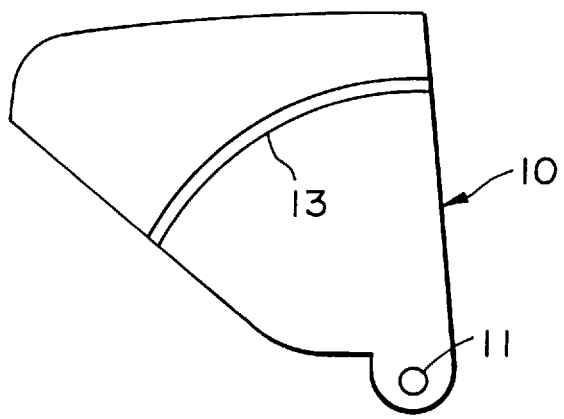
FIG. 7 is a backside view of the barrier of the second embodiment of the present invention.

Second embodiment, FIG. 5 to FIG. 7

According to the second embodiment of the present invention, the guide rail 21 for guiding the barrier 10 is arranged on the front frame 20 of the camera body 1 and in the vicinity of the lens barrel 2. In accordance therewith, the guide projection 13 of the barrier 10 is also arranged somewhat closer to the shaft 11.

Other mechanisms are the same as those of the first embodiment, and the same marks are used for the identical members or portions. Further, effects of the barrier 10 of the second embodiment are the same as those of the first embodiment.

Other embodiments

It is to be noted the camera with a barrier of the present invention is not limited to the afore-mentioned embodiments, and is able to be variously modified within a range of its point. For example, optical elements covered by the barrier are not limited to the afore-said finder light receiving portion, but may be a red-eye lamp, a remote control light receiving portion, a self timer display portion or the like. Additionally the holding mechanism of the barrier holding shaft is optional.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A camera comprising:
   a camera body having a front portion with a long side and a short side, said front portion having a central portion and a pair of outer portions arranged perpendicular to the long side;
   a lens barrel arranged in the central portion of the front portion of the body;
   an electronic flash arranged in an outer portion of the front portion of the body;
   optical elements arranged in the front portion of the body and in the vicinity of said lens barrel; and
   a barrier rotatable around a fixed shaft substantially parallel to an optical axis of a lens between:
      a closed position in which the lens barrel, the electronic flash and the optical elements are covered by the barrier; and
      an opened position in which the barrier uncovers said lens barrel, electronic flash, and optical elements,
   wherein the lens barrel is arranged between the fixed shaft and the electronic flash.

2. The camera as claimed in claim 1, wherein said optical elements includes at least a finder objective portion, an AE light receiving portion, an AF light emitting portion and an AF light receiving portion.

3. The camera as claimed in claim 2, wherein said optical elements further includes a red-eye lamp, a remote control light receiving portion and a self timer display portion.

4. The camera as claimed in claim 1, wherein said barrier form contains a holding portion.

5. The camera as claimed in claim 1, wherein said electric flash is arranged diagonally right side above the lens barrel, and said optical elements are arranged above the lens barrel.

6. The camera as claimed in claim 5, wherein said shaft is arranged diagonally left said below the lens barrel.

7. The camera as claimed in claim 1, wherein crossing angles between a segment connecting the center of the lens barrel and the shaft and a segment connecting the center of the lens barrel and each of the electric flash and optical elements are over 90°.

8. The camera as claimed in claim 1, wherein said barrier rotates approximately 90° between the opening position and the closing position.

9. The camera as claimed in claim 1, wherein said barrier is substantially right triangle-shaped, and the shaft is positioned in a portion of one of its acute angles.

10. The camera as claimed in claim 1, wherein said central portion is as wide as said lens barrel.

11. The camera as claimed in claim 1, wherein said electronic flash is arranged in a corner of an outer portion.

12. The camera as claimed in claim 1, wherein said electric flash is arranged in the corner of the body.

13. A camera comprising:
   a camera body having a front portion with a long side and a short side, said front portion having a central portion and a pair of outer portions arranged perpendicular to the long side;
   a lens barrel arranged in the central portion of the front portion of the body;
   an electronic flash arranged in an outer portion of the front portion of the body; and
   a barrier rotatable around a fixed shaft substantially parallel to an optical axis of a lens between:
      a closed position in which the lens barrel and electronic flash are covered by the barrier; and
      an opened position in which the barrier uncovers the lens barrel and the electronic flash,
   wherein the lens barrel is arranged between the fixed shaft and the electronic flash.

14. The camera as claimed in claim 13, further comprising a finder objective portion arranged in the front portion of the body and covered by the barrier at the closing position.

15. The camera as claimed in claim 14, further comprising an AF sensor arranged in the front portion of the body and covered by the barrier at the closing position.

16. The camera as claimed in claim 13, wherein said central portion is as wide as said lens barrel.

17. The camera as claimed in claim 13, wherein said electronic flash is arranged in a corner of an outer portion.

18. A camera comprising:
   a camera body having a front portion with a long side and a short side, said front portion having a central portion and a pair of outer portions arranged perpendicular to the long side;

a lens barrel arranged in the central portion of the front portion of the body;

an electronic flash arranged in an outer portion of the front portion of the body;

optical elements arranged in the front portion of the body and in the vicinity of said lens barrel; and a barrier rotatable around a fixed shaft substantially parallel to an optical axis of a lens between:
- a closed position in which the lens barrel, the electronic flash and the optical elements are covered by the barrier; and
- an opened position in which the barrier uncovers the lens barrel, the electronic flash, and the optical elements, wherein the barrier positions in front of the body at both the closing position and the opening position.

19. The camera as claimed in claim 18, wherein said optical elements includes a finder objective portion.

20. The camera as claimed in claim 19, wherein said optical elements further includes an AE light receiving portion, an AF light emitting portion and an AF light receiving portion.

21. The camera as claimed in claim 18, wherein said barrier is substantially triangle-shaped.

22. The camera as claimed in claim 21, wherein said barrier rotates approximately 90° between the opening position and the closing position.

23. The camera as claimed in claim 18, wherein said central portion is as wide as said lens barrel.

24. The camera as claimed in claim 18, wherein said electronic flash is arranged in a corner of an outer portion.

* * * * *